United States Patent
Chen et al.

(10) Patent No.: US 11,144,232 B2
(45) Date of Patent: Oct. 12, 2021

(54) STORAGE SYSTEM WITH EFFICIENT SNAPSHOT PAIR CREATION DURING SYNCHRONOUS REPLICATION OF LOGICAL STORAGE VOLUMES

(71) Applicant: EMC IP Holding Company LLC, Hopkinton, MA (US)

(72) Inventors: Xiangping Chen, Sherborn, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 84 days.

(21) Appl. No.: 16/797,063

(22) Filed: Feb. 21, 2020

(65) Prior Publication Data

US 2021/0263649 A1 Aug. 26, 2021

(51) Int. Cl.
*G06F 3/06* (2006.01)

(52) U.S. Cl.
CPC ............ *G06F 3/065* (2013.01); *G06F 3/0619* (2013.01); *G06F 3/0665* (2013.01); *G06F 3/0673* (2013.01)

(58) Field of Classification Search
CPC ...... G06F 3/065; G06F 3/0619; G06F 3/0665; G06F 3/0673
See application file for complete search history.

(56) References Cited

U.S. PATENT DOCUMENTS

| | | |
|---|---|---|
| 7,165,155 B1 | 1/2007 | Duprey et al. |
| 7,440,982 B2 | 10/2008 | Lu et al. |
| 7,444,464 B2 | 10/2008 | Urmston et al. |
| 8,095,726 B1 | 1/2012 | O'Connell et al. |
| 8,214,612 B1 | 7/2012 | Natanzon |

(Continued)

FOREIGN PATENT DOCUMENTS

| | | |
|---|---|---|
| WO | 2016111954 A1 | 7/2016 |
| WO | PCT/US2019/024885 | 1/2020 |
| WO | PCT/US2019/024900 | 1/2020 |

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Eric Cardwell
(74) *Attorney, Agent, or Firm* — Ryan, Mason & Lewis, LLP

(57) ABSTRACT

An apparatus includes at least one processing device, with the at least one processing device being configured, in conjunction with synchronous replication of at least one logical storage volume between first and second storage systems arranged in an active-active configuration, to create a first snapshot of the logical storage volume in the first storage system, to create a second snapshot of the logical storage volume in the second storage system, to create a third snapshot of the logical storage volume in the first storage system, to initiate an asynchronous replication cycle to transfer differential data between the first and the third snapshots in the first storage system to the second storage system, and to utilize the second snapshot and the transferred differential data to create an additional snapshot of the logical storage volume in the second storage system that is synchronized with the third snapshot in the first storage system.

20 Claims, 6 Drawing Sheets

(56) References Cited

U.S. PATENT DOCUMENTS

| | | | |
|---|---|---|---|
| 8,301,593 B2 | 10/2012 | Hoffmann et al. | |
| 8,332,354 B1* | 12/2012 | Chatterjee | G06F 11/1461 707/624 |
| 8,335,899 B1 | 12/2012 | Meiri et al. | |
| 9,069,709 B1* | 6/2015 | Natanzon | G06F 11/1446 |
| 9,104,326 B2 | 8/2015 | Frank et al. | |
| 9,208,162 B1 | 12/2015 | Hallak et al. | |
| 9,286,003 B1 | 3/2016 | Hallak et al. | |
| 9,514,014 B2 | 12/2016 | Webman et al. | |
| 9,552,258 B2 | 1/2017 | Hallak et al. | |
| 9,606,870 B1 | 3/2017 | Meiri et al. | |
| 9,716,754 B2 | 7/2017 | Swift | |
| 10,176,046 B1 | 1/2019 | Hu et al. | |
| 10,261,693 B1 | 4/2019 | Schneider et al. | |
| 10,324,640 B1 | 6/2019 | Chen et al. | |
| 10,338,851 B1 | 7/2019 | Kronrod et al. | |
| 10,359,965 B1 | 7/2019 | Stronge et al. | |
| 10,394,485 B1 | 8/2019 | Chen et al. | |
| 10,437,501 B1 | 10/2019 | Kucherov et al. | |
| 10,437,855 B1 | 10/2019 | Stronge et al. | |
| 10,466,925 B1 | 11/2019 | Blanco et al. | |
| 10,496,324 B2 | 12/2019 | Meiri et al. | |
| 10,496,489 B1 | 12/2019 | Chen et al. | |
| 10,496,672 B2 | 12/2019 | Meiri et al. | |
| 10,558,613 B1 | 2/2020 | Shveidel et al. | |
| 2007/0022121 A1 | 1/2007 | Bahar et al. | |
| 2008/0279462 A1 | 11/2008 | Celi, Jr. | |
| 2009/0132955 A1 | 5/2009 | Garg et al. | |
| 2009/0276593 A1 | 11/2009 | Jacobson et al. | |
| 2010/0179941 A1 | 7/2010 | Agrawal et al. | |
| 2011/0022566 A1 | 1/2011 | Beaverson et al. | |
| 2011/0225123 A1 | 9/2011 | D'Souza et al. | |
| 2012/0124282 A1 | 5/2012 | Frank et al. | |
| 2013/0305002 A1 | 11/2013 | Hallak et al. | |
| 2013/0325824 A1 | 12/2013 | Shoens | |
| 2014/0181016 A1 | 6/2014 | Whitehead et al. | |
| 2014/0244935 A1 | 8/2014 | Ezra et al. | |
| 2015/0378766 A1 | 12/2015 | Beveridge et al. | |
| 2015/0378785 A1 | 12/2015 | Tarasuk-Levin et al. | |
| 2016/0150012 A1 | 5/2016 | Barszczak et al. | |
| 2016/0170987 A1 | 6/2016 | Kesselman | |
| 2016/0202927 A1 | 7/2016 | Klarakis et al. | |
| 2016/0224259 A1 | 8/2016 | Ahrens et al. | |
| 2016/0261513 A1 | 9/2016 | Aingaran et al. | |
| 2016/0345207 A1 | 11/2016 | Kwak et al. | |
| 2017/0075842 A1 | 3/2017 | Su et al. | |
| 2017/0185529 A1 | 6/2017 | Chhabra et al. | |
| 2017/0192857 A1 | 7/2017 | Meiri et al. | |
| 2018/0095873 A1 | 4/2018 | Nakagoe et al. | |
| 2018/0260125 A1* | 9/2018 | Botes | G06F 3/067 |
| 2019/0303490 A1 | 10/2019 | Chen et al. | |
| 2019/0392060 A1 | 12/2019 | Meiri et al. | |
| 2020/0026616 A1 | 1/2020 | Hu et al. | |
| 2020/0293551 A1* | 9/2020 | Chen | G06F 11/2094 |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Dell EMC, "PowerMax OS," Dell EMC PowerMax Family Product Guide, May 2019, 192 pages.

Dell EMC, "Dell EMC VxRack FLEX," Dell EMC Product Overview, 2018, 5 pages.

U.S. Appl. No. 15/662,708 filed in the name of Xiangping Chen et al. on Jul. 28, 2017, and entitled "Token-Based Data Flow Control in a Clustered Storage System."

U.S. Appl. No. 15/793,121 filed in the name of David Meiri et al. on Oct. 25, 2017, and entitled "Opportunistic Compression of Replicated Data in a Content Addressable Storage System."

U.S. Appl. No. 15/824,536 filed in the name of Christopher Sayles et al. on Nov. 28, 2017, and entitled "Storage System with Asynchronous Messaging between Processing Modules for Data Replication."

U.S. Appl. No. 16/253,793 filed in the name of Yuval Harduf et al. on Jan. 22, 2019, and entitled "Storage System with Data Consistency Checking in Synchronous Replication Using Active Snapshot Set."

U.S. Appl. No. 16/265,131 filed in the name of Lior Kamran et al. on Feb. 1, 2019, and entitled "Storage System with Write Cache Release Protection."

U.S. Appl. No. 16/343,942 filed in the name of Yonatan Shtarkman et al. on Apr. 22, 2019, and entitled "Snapshot-Enabled Storage System Implementing Algorithm for Efficient Reclamation of Snapshot Storage Space."

U.S. Appl. No. 16/343,949 filed in the name of Asaf Porath et al. on Apr. 22, 2019, and entitled "Snapshot-Enabled Storage System Implementing Algorithm for Efficient Reading of Data from Stored Snapshots."

U.S. Appl. No. 16/396,897 filed in the name of Anton Kucherov et al. on Apr. 29, 2019, and entitled "Storage System with Deduplication-Aware Replication Implemented Using a Standard Storage Command Protocol."

U.S. Appl. No. 16/413,050 filed in the name of Xiangping Chen et al. on May 15, 2019, and entitled "Storage System with Coordinated Recovery across Multiple Input-Output Journals of Different Types."

U.S. Appl. No. 16/663,524 filed in the name of Xiangping Chen et al. on Oct. 25, 2019, and entitled "Storage System with Throughput-Based Timing of Synchronous Replication Recovery."

U.S. Appl. No. 16/665,651 filed in the name of Lior Kamran et al. on Oct. 28, 2019, and entitled "Recovery Flow with Reduced Address Lock Contention in a Content Addressable Storage System."

U.S. Appl. No. 16/779,839 filed in the name of David Meiri et al. on Feb. 3, 2020, and entitled "Storage System with Continuous Data Verification for Synchronous Replication of Logical Storage Volumes."

U.S. Appl. No. 16/779,828 filed in the name of David Meiri et al. on Feb. 3, 2020, and entitled "Storage System with Write-Via-Hash Functionality for Synchronous Replication of Logical Storage Volumes."

* cited by examiner

12
STORAGE SYSTEM WITH EFFICIENT SNAPSHOT PAIR CREATION DURING SYNCHRONOUS REPLICATION OF LOGICAL STORAGE VOLUMES

FIELD

The field relates generally to information processing systems, and more particularly to storage in information processing systems.

BACKGROUND

Many information processing systems are configured to replicate data from one storage system to another storage system, possibly at different physical sites. In some cases, such arrangements are utilized to support disaster recovery functionality within the information processing system. For example, an enterprise may replicate data from a production data center to a disaster recovery data center. In the event of a disaster at the production site, applications can be started at the disaster recovery site using the data that has been replicated to that site so that the enterprise can continue its business.

Data replication in these and other contexts can be implemented using asynchronous replication at certain times and synchronous replication at other times. For example, asynchronous replication may be configured to periodically transfer data in multiple cycles from a source site to a target site, while synchronous replication may be configured to mirror host writes from the source site to the target site as the writes are made at the source site. Storage systems participating in a replication process can therefore each be configured to support both asynchronous and synchronous replication modes.

For a synchronous replication arrangement using a high availability active-active configuration, such as a "metro cluster," data is replicated in both directions between paired first and second storage systems, and a host write is acknowledged back to the host only after it has been persisted in both storage systems. Such a synchronous replication arrangement ideally maintains identical data content on both storage systems, other than for so-called "in-flight" input-output (TO) operations, illustratively including write operations that have been persisted on one side but not on the other side, and for which an acknowledgement has therefore not yet been sent back to the host.

In these and other synchronous replication contexts, various malfunctions such as link loss, storage module restart or code issues can cause the two storage systems to lose their synchronization, due to host writes being applied to data on one side but not the other side. It is important to detect and correct such inconsistencies at the earliest possible opportunity in order to minimize data loss or corruption.

Such detection and correction functionality in an active-active configuration can be facilitated through creation of identical point-in-time snapshot sets on both sides of the configuration, but unfortunately it can be very difficult to create such snapshot sets. For example, under typical conventional practice, in order to create identical point-in-time snapshot sets on both sides of the active-active configuration, it is generally necessary to suspend host IO operations on both sides simultaneously, drain all in-flight IO operations in both directions completely, and then create the snapshot sets on both sides, at which point the host IO operations can be safely resumed. However, this conventional approach is problematic in that it introduces significant increases in IO latency while the host IO operations are suspended and any in-flight IO operations are drained. A need therefore exists for improved techniques for creating identical snapshot sets in an active-active configuration.

SUMMARY

Illustrative embodiments provide techniques for efficient snapshot pair creation during synchronous replication of one or more logical storage volumes between first and second storage systems arranged in an active-active configuration, such as a metro cluster. For example, in some embodiments, corresponding identical point-in-time snapshots, also referred to herein as an identical snapshot pair or a pair of synchronized snapshots, are created on respective first and second storage system sides of the active-active configuration, without the need to suspend host IO operations or to drain in-flight IO operations. As a result, the excessive increases in IO latency associated with the above-described conventional approach are avoided. These embodiments allow inconsistent data to be detected and corrected in a particularly efficient manner, without any adverse impact to storage system performance.

A given first or second storage system in some embodiments disclosed herein illustratively comprises a clustered implementation of a content addressable storage (CAS) system having a distributed storage controller. Similar advantages can be provided in other types of storage systems.

In one embodiment, an apparatus includes at least one processing device comprising a processor coupled to a memory. The at least one processing device is configured, in conjunction with synchronous replication of at least one logical storage volume between first and second storage systems arranged in an active-active configuration, to create a first snapshot of the logical storage volume in the first storage system, to create a second snapshot of the logical storage volume in the second storage system, and to create a third snapshot of the logical storage volume in the first storage system. The at least one processing device is further configured to initiate an asynchronous replication cycle to transfer differential data between the first and the third snapshots in the first storage system to the second storage system, and to utilize the second snapshot and the transferred differential data to create an additional snapshot of the logical storage volume in the second storage system that is synchronized with the third snapshot in the first storage system. In accordance with the active-active configuration of the first and second storage systems, the synchronous replication comprises synchronous replication of each of a first plurality of write operations from the first storage system to the second storage system and synchronous replication of each of a second plurality of write operations from the second storage system to the first storage system.

In some embodiments, each of the first and second storage systems sends a notification to the other of the first and second storage systems to indicate that the first or second storage system has completed any write operations that were in-flight at the time of its creation of the corresponding one of the first snapshot or the second snapshot. Receipt of the notification from the first storage system in the second storage system illustratively triggers creation of the second snapshot in the second storage system. Similarly, receipt of the notification from the second storage system in the first storage system illustratively triggers creation of the third snapshot in the first storage system.

The first, second, third and additional snapshots in some embodiments comprise respective first, second, third and additional snapshot sets each comprising, for example, a plurality of contemporaneous snapshots of respective ones of a plurality of logical storage volumes subject to the synchronous replication between the first and second storage systems, or another arrangement of multiple related snapshots. The term "snapshot" as used herein is therefore intended to be broadly construed, and may refer in some embodiments to a set of one or more snapshots, also referred to herein as a "snap set," such as a set of multiple snapshots generated for respective multiple logical storage volumes subject to the synchronous replication, or a set of related snapshots characterizing different aspects of at least one logical storage volume. Numerous other arrangements are possible in other embodiments.

In some embodiments, said at least one processing device is further configured to mark in-flight IO operations in the first storage system at the time of creation of the first snapshot, and to create the second snapshot in the second storage system responsive to completion of the marked in-flight IO operations in the first storage system. As indicated above, the second storage system is illustratively made aware of the completion of the marked in-flight IO operations in the first storage system via a command or other type of notification sent by the first storage system to the second storage system.

The second snapshot in the second storage system illustratively corresponds to the first snapshot in the first storage system but captures any subsequent modifications to the logical storage volume based on completion of the marked in-flight IO operations in the first storage system.

In some embodiments, said at least one processing device is further configured to mark in-flight IO operations in the second storage system at the time of creation of the second snapshot, and to create the third snapshot in the first storage system responsive to completion of the marked in-flight IO operations in the second storage system. As indicated above, the first storage system is illustratively made aware of the completion of the marked in-flight IO operations in the second storage system via a command or other type of notification sent by the second storage system to the first storage system.

The third snapshot in the first storage system illustratively corresponds to the second snapshot in the second storage system but captures any subsequent modifications to the logical storage volume based on completion of the marked in-flight IO operations in the second storage system.

In some embodiments, utilizing the second snapshot and the transferred differential data to create an additional snapshot of the logical storage volume in the second storage system that is synchronized with the third snapshot in the first storage system comprises creating a fourth snapshot of the second snapshot in the second storage system, and updating the fourth snapshot using the transferred differential data so as to synchronize the fourth snapshot in the second storage system with the third snapshot in the first storage system. Content of the fourth snapshot in such an embodiment is initially the same as content of the second snapshot at the time of creation of the fourth snapshot.

The transferred differential data illustratively comprises an asynchronous replication delta between the third and first snapshots and updating the fourth snapshot comprises adding the asynchronous replication delta to the initial content of the fourth snapshot.

In some embodiments, the first and second storage systems comprise respective CAS systems having respective sets of non-volatile memory storage devices.

Additionally or alternatively, the first and second storage systems are illustratively associated with respective source and target sites of a synchronous replication process, with the source site comprising a production site data center and the target site comprising a disaster recovery site data center, although a wide variety of other arrangements are possible.

The at least one processing device in some embodiments comprises at least portions of respective first and second storage controllers of respective ones of the first and second storage systems.

As another example, the at least one processing device illustratively comprises at least one of a plurality of storage nodes of a distributed storage system, with each such storage node comprising a set of processing modules configured to communicate with corresponding sets of processing modules on other ones of the storage nodes. The sets of processing modules of the storage nodes of the distributed storage system collectively comprise at least a portion of a storage controller of the storage system.

Numerous other clustered and non-clustered storage system arrangements are possible in other embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
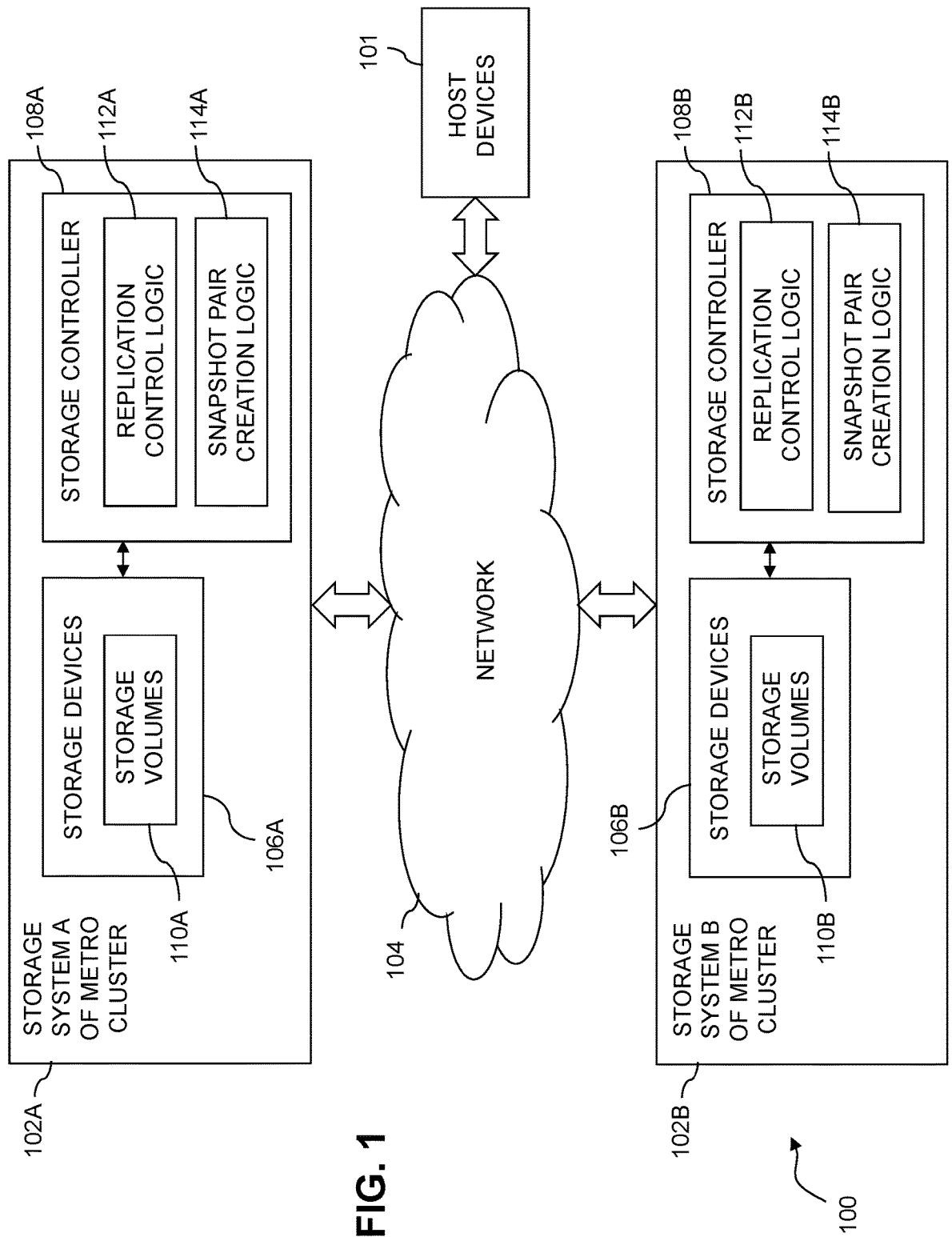
FIG. 1 is a block diagram of an information processing system comprising first and second storage systems configured with functionality for efficient snapshot pair creation in synchronous replication in an illustrative embodiment.

FIG. 1 shows an information processing system 100 configured in accordance with an illustrative embodiment. The information processing system 100 comprises a plurality of host devices 101, a first storage system 102A and a second storage system 102B, all of which are configured to communicate with one another over a network 104. The first and second storage systems 102 are also denoted as system A and system B, respectively, and are arranged in an active-active configuration, illustratively a metro cluster. The first and second storage systems 102 are more particularly configured in this embodiment to participate in a synchronous replication process in which one or more storage volumes are synchronously replicated between the first storage system 102A and the second storage system 102B, possibly with involvement of at least one of the host devices 101. The one or more storage volumes that are synchronously replicated between the first storage system 102A and the second storage system 102B are illustratively part of a designated consistency group.

The synchronous replication process can be initiated from another replication process of a different type, such as an asynchronous replication process. Accordingly, the storage systems 102 can transition from asynchronous to synchronous replication, and vice versa. In some embodiments, asynchronous and synchronous replication modes at least partially overlap with one another. For example, as will be described in more detail below, illustrative embodiments are configured to perform an asynchronous replication cycle to transfer differential data between snapshots from one of the storage systems 102 to the other, during an ongoing synchronous replication process.

Each of the storage systems 102 is illustratively associated with a corresponding set of one or more of the host devices 101. The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices. Such applications illustratively generate input-output (TO) operations that are processed by a corresponding one of the storage systems 102. The term "input-output" as used herein refers to at least one of input and output. For example, IO operations may comprise write requests and/or read requests directed to logical addresses of a particular logical storage volume of a given one of the storage systems 102. These and other types of IO operations are also generally referred to herein as IO requests.

The storage systems 102 illustratively comprise respective processing devices of one or more processing platforms. For example, the storage systems 102 can each comprise one or more processing devices each having a processor and a memory, possibly implementing virtual machines and/or containers, although numerous other configurations are possible.

The storage systems 102 can additionally or alternatively be part of cloud infrastructure such as an Amazon Web Services (AWS) system. Other examples of cloud-based systems that can be used to provide at least portions of the storage systems 102 include Google Cloud Platform (GCP) and Microsoft Azure.

The storage systems 102 may be implemented on a common processing platform, or on separate processing platforms.

The host devices 101 are illustratively configured to write data to and read data from the storage systems 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The first storage system 102A comprises a plurality of storage devices 106A and an associated storage controller 108A. The storage devices 106A store storage volumes 110A. The storage volumes 110A illustratively comprise respective logical units (LUNs) or other types of logical storage volumes that are subject to the above-noted synchronous replication process between the first and second storage systems 102.

Similarly, the second storage system 102B comprises a plurality of storage devices 106B and an associated storage controller 108B. The storage devices 106B store storage volumes 110B, at least a portion of which represent respective LUNs or other types of logical storage volumes that are subject to the above-noted synchronous replication process between the first and second storage systems 102.

The storage devices 106 of the storage systems 102 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM (ReRAM), spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, at least one of the storage systems 102 illustratively comprises a scale-out all-flash content addressable storage array such as an XtremIO™ storage array from Dell EMC of Hopkinton, Mass. A wide variety of other types of storage arrays can be used in implementing a given one of the storage systems 102 in other embodiments, including by way of example one or more VNX®, VMAX®, Unity™ or PowerMax™ storage arrays, commercially available from Dell EMC. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the host devices 101 and the storage systems 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage systems 102 illustratively comprise SCSI or iSCSI commands, other embodiments can implement 10 operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage controller 108A of first storage system 102A in the FIG. 1 embodiment includes replication control logic 112A and snapshot pair creation logic 114A. It can also include additional elements, such as a signature generator for generating content-based signatures of respective data pages.

Similarly, the storage controller 108B of second storage system 102B includes replication control logic 112B and snapshot pair creation logic 114B. The storage controller 108B, like the storage controller 108A, can also include additional elements, such as a signature generator for generating content-based signatures of respective data pages.

The instances of replication control logic 112A and 112B are collectively referred to herein as replication control logic 112. Such replication control logic instances are also referred to herein as individually or collectively comprising at least a portion of a "replication engine" of the system 100.

The replication control logic 112 of the storage systems 102 controls performance of the synchronous replication process carried out between those storage systems, which as noted above in some embodiments further involves at least one of the host devices 101. The data replicated between the first storage system 102A and the second storage system 102B can include all of the data stored in the first storage system 102A, or only certain designated subsets of the data stored in the first storage system 102A, such as particular designated sets of LUNs or other logical storage volumes. Different replication processes of different types can be implemented for different parts of the stored data.

A given storage volume designated for active-active synchronous replication between the first storage system 102A and the second storage system 102B illustratively comprises a set of one or more LUNs or other instances of the storage volumes 110 of the first and second storage systems 102. Each such logical storage volume illustratively comprises at least a portion of a physical storage space of one or more of the storage devices 106 on its corresponding one of the storage systems 102.

The instances of snapshot pair creation logic 114A and 114B are collectively referred to herein as snapshot pair creation logic 114. Such snapshot pair creation logic instances of the storage systems 102 are illustratively configured to control the performance of a process for efficient snapshot pair creation in synchronous replication, such as that shown in the flow diagram of FIG. 4. At least one of the host devices 101 in some embodiments can also include one or more instances of snapshot pair creation logic and possibly also one or more instances of replication control logic, as well as additional or alternative components, such as one or more signature generators.

The storage controllers 108 of the storage systems 102 may include additional modules and other components typically found in conventional implementations of storage controllers and storage systems, although such additional modules and other components are omitted from the figure for clarity and simplicity of illustration.

It will be assumed for the following description of the FIG. 1 embodiment that there is an ongoing synchronous replication process being carried out between the first storage system 102A and the second storage system 102B in the system 100, utilizing their respective instances of replication control logic 112.

As indicated previously, the storage systems 102 are illustratively arranged in an active-active configuration, illustratively a metro cluster, although other types of active-active configurations can be used in other embodiments. For example, in this metro cluster arrangement, the storage systems 102 correspond to respective paired systems of a metro cluster, and data of at least one logical storage volume is replicated between storage systems 102 synchronously in both directions. Other types of synchronous replication in active-active configurations may be used in other embodiments. The term "active-active configuration" as used herein is therefore intended to be broadly construed.

Such data replication across the multiple storage systems 102 can be used to facilitate failure recovery in the system 100. For example, one of the storage systems 102 may operate as a production storage system relative to the other storage system which operates as a backup or recovery storage system.

An exemplary synchronous replication process more particularly comprises a synchronous replication process in which host writes to a consistency group comprising one or more storage volumes are mirrored from the first storage system 102A to the second storage system 102B as the host writes are made at the first storage system 102A, and vice versa. The synchronous replication process is therefore configured such that each host write to one of the storage systems 102 is mirrored to the other one of the storage systems 102. Other types of replication processes may be used in other embodiments.

In such an arrangement, a given one of the host devices 101 writes data to one of the storage systems 102, and that host device receives an acknowledgement of success only after the data has been successfully written to both of the storage systems 102. For example, if the host device directs a write to the first storage system 102A, that storage array mirrors the write to the second storage system 102B and receives an acknowledgement of success back from the second storage system 102B. The first storage system 102A then responds back to the host device with an acknowledgement of success.

The first storage system 102A and second storage system 102B in some embodiments comprise respective source and target storage systems of a synchronous replication process. However, in other embodiments, the designation of first and second storage systems as respective source and target storage systems can be reversed. In some embodiments, each of the first and second storage systems 102 operates as both "source" and "target" relative to the other one of the first and second storage systems 102.

Other types of replication arrangements can be used in other embodiments. For example, the first and second storage systems 102 may be configurable to operate in both asynchronous and synchronous replication modes, with transitions between the modes controlled by their respective instances of replication control logic 112.

A given such asynchronous replication mode illustratively comprises a cycle-based asynchronous replication process in which a consistency group comprising one or more storage volumes is replicated from the first storage system 102A to the second storage system 102B over a plurality of asynchronous replication cycles.

Other examples of replication processes that can be used in illustrative embodiments include active-active replication in which one of the storage systems operates as a "leader" relative to another one of the storage systems operating as a "follower" in implementing consistent synchronous writes to both storage systems. Such active-active replication is considered a type of synchronous replication as that term is broadly used herein.

Accordingly, a given replication process supported by the storage systems 102 may include both asynchronous and synchronous replication modes as well as support for concurrent operation of such modes and separate operation of the individual modes.

Additional details regarding example processes for efficient snapshot pair creation in system 100 will now be described.

In synchronous replication, it is generally desirable for the first storage system 102A and the second storage system 102B to have identical data at all times. Therefore, it is important to detect and correct discrepancies between source and target data on an ongoing basis, possibly in real time. However, during an initial synchronization or a resynchronization after recovery from a link loss or a consistency group "trip" event, the storage systems 102 will likely have different data. During these times, data verification may be suspended since there is no expectation that the data is the same. Once synchronization of the first and second storage systems 102 is reached, there is an expectation that the source and target data are the same. However, every host write has to be written to one side before it is written to the other. In some systems, the host write is first written to the source, and then replicated to the target. In others, the host write is first written to the target, then replicated to the source. Either way, the host write cannot be written simultaneously to both sides at the same time. This means that in practice, unless host writes have stopped for at least a few seconds, it is only expected that the source and target are identical for pages that are not involved in an active IO process, or in other words, are not involved in in-flight IO operations.

Accordingly, in conjunction with synchronous replication, various malfunctions such as link loss, storage module restart or code issues can cause the first and second storage systems 102 to lose their synchronization, with host writes being applied to data on one system but not the other.

Detection and correction of such inconsistencies can be facilitated through the creation of identical snapshots on the paired first and second storage systems 102. However, under conventional practice, it is difficult to create such snapshots without significant increases in IO latency, as described elsewhere herein.

Illustrative embodiments provide techniques for efficient snapshot pair creation during synchronous replication of one or more logical storage volumes between first and second storage systems arranged in an active-active configuration. For example, in some embodiments, corresponding identical point-in-time snapshots are created on respective first and second storage system sides of the active-active configuration without the need to suspend host IO operations or to drain in-flight IO operations. As a result, the excessive increases in IO latency associated with the above-described conventional approach are avoided. These embodiments allow inconsistent data to be detected and corrected in a particularly efficient manner, without any adverse impact to storage system performance.

The information processing system 100 is illustratively configured to provide such efficient snapshot pair creation in synchronous replication as part of a replication process carried out between the first and second storage systems 102. These and other operations related to efficient snapshot pair creation in synchronous replication as disclosed herein are illustratively implemented at least in part by or otherwise under the control of the instances of snapshot pair creation logic 114 of the storage controllers 108 of respective first and second storage systems 102. One or more such operations can be additionally or alternatively controlled by one or more other system components in other embodiments.

In accordance with this functionality of information processing system 100, the storage controllers 108 of first and second storage systems 102 are configured, in conjunction with synchronous replication of at least one logical storage volume between the first and second storage systems 102, to create a first snapshot of the logical storage volume in the first storage system 102A, to create a second snapshot of the logical storage volume in the second storage system 102B, to create a third snapshot of the logical storage volume in the first storage system 102A, to initiate an asynchronous replication cycle to transfer differential data between the first and the third snapshots in the first storage system 102A to the second storage system 102B, and to utilize the second snapshot and the transferred differential data to create an additional snapshot of the logical storage volume in the second storage system 102B that is synchronized with the third snapshot in the first storage system 102A.

The third and additional snapshots are an example of what is referred to herein as an "identical snapshot pair," illustratively comprising a pair of synchronized snapshots, with one of the snapshots in the pair being located on one of the paired first and second storage systems 102 and the other snapshot in the pair being located on the other one of the paired first and second storage systems 102. Such an identical snapshot pair is also referred to herein as a pair of synchronized snapshots.

The first, second, third and additional snapshots in some embodiments comprise respective first, second, third and additional snapshot sets each comprising, for example, a plurality of contemporaneous snapshots of respective ones of a plurality of logical storage volumes subject to the synchronous replication between the first and second storage systems, or another arrangement of multiple related snapshots. The term "snapshot" as used herein is therefore intended to be broadly construed, and may refer in some embodiments to a set of one or more snapshots, also referred to herein as a "snap set," such as a set of multiple snapshots generated for respective multiple logical storage volumes subject to the synchronous replication, or a set of related snapshots characterizing different aspects of at least one logical storage volume. Numerous other arrangements are possible in other embodiments.

As mentioned above, the first and second storage systems 102 are arranged in an active-active configuration, illustratively a metro cluster, although other types of active-active configurations can be used.

The synchronous replication illustratively comprises synchronous replication of each of a first plurality of write operations from the first storage system 102A to the second storage system 102B and synchronous replication of each of a second plurality of write operations from the second storage system 102B to the first storage system 102A. Accordingly, the synchronous replication in some embodiments is bidirectional, involving replication of write operations from the first storage system 102A to the second storage system 102B, and replication of other write operations from the second storage system 102B to the first storage system 102A.

In some embodiments, each of the first and second storage systems 102 sends a notification to the other of the first and second storage systems 102 to indicate that the first or second storage system has completed any write operations that were in-flight at the time of its creation of the corresponding one of the first snapshot or the second snapshot. Receipt of the notification from the first storage system 102A in the second storage system 102B illustratively triggers creation of the second snapshot in the second storage system 102B. Similarly, receipt of the notification from the second storage system 102B in the first storage system 102A illustratively triggers creation of the third snapshot in the first storage system 102A.

In some embodiments, the storage controller 108A of the first storage system 102A is configured to mark in-flight IO operations in the first storage system 102A at the time of creation of the first snapshot. The storage controller 108B of the second storage system 102B is configured to create the second snapshot in the second storage system 102B responsive to completion of the marked in-flight IO operations in the first storage system 102A.

As indicated above, the second storage system 102B is illustratively made aware of the completion of the marked in-flight IO operations in the first storage system 102A via a command or other type of notification sent by the first storage system 102A to the second storage system 102B. Accordingly, the first storage system 102A can direct the second storage system 102B to create the second snapshot, after the first storage system 102A has completed its marked in-flight IO operations.

The second snapshot in the second storage system 102B illustratively corresponds to the first snapshot in the first storage system 102A, but captures any subsequent modifications to the logical storage volume based on completion of the marked in-flight IO operations in the first storage system 102A.

Similarly, the storage controller 108B of the second storage system 102B is configured to mark in-flight IO operations in the second storage system 102B at the time of creation of the second snapshot. The storage controller 108A of the first storage system 102A is configured to create the third snapshot in the first storage system 102A responsive to completion of the marked in-flight IO operations in the second storage system 102B.

As indicated above, the first storage system 102A is illustratively made aware of the completion of the marked in-flight IO operations in the second storage system 102B via a command or other type of notification sent by the second storage system 102B to the first storage system 102A. Accordingly, the second storage system 102B can direct the first storage system 102A to create the third snapshot, after the second storage system 102B has completed its marked in-flight IO operations.

The third snapshot in the first storage system 102A illustratively corresponds to the second snapshot in the second storage system 102B, but captures any subsequent modifications to the logical storage volume based on completion of the marked in-flight IO operations in the second storage system 102B.

In some embodiments, utilizing the second snapshot and the transferred differential data to create an additional snapshot of the logical storage volume in the second storage system 102B that is synchronized with the third snapshot in the first storage system 102A comprises creating a fourth snapshot of the second snapshot in the second storage system 102B, and updating the fourth snapshot using the transferred differential data so as to synchronize the fourth snapshot in the second storage system 102B with the third snapshot in the first storage system 102A. The content of the fourth snapshot may initially be the same as content of the second snapshot at the time of creation of the fourth snapshot. The transferred differential data illustratively comprises an asynchronous replication delta between the third and first snapshots, and updating the fourth snapshot comprises adding the asynchronous replication delta to the initial content of the fourth snapshot.

The above-described operations associated with efficient snapshot pair creation in synchronous replication are illustratively performed at least in part by or under the control of the instances of replication control logic 112 operating in cooperation with the instances of snapshot pair creation logic 114 in the storage controllers 108 of the respective first and second storage systems 102.

Such operations provide an illustrative example of a process for efficient snapshot pair creation" in synchronous replication of one or more logical storage volumes between first and second storage systems 102 arranged in a metro cluster or other active-active configuration. Additional or alternative steps may be used in such a process in other embodiments. Also, the ordering of the steps can be varied, and different portions of the process can be performed at least in part in parallel with one another.

A more detailed illustration of an example process for efficient snapshot pair creation in synchronous replication implementing at least some of the above-described operations will be described below in conjunction with the flow diagram of FIG. 4.

The storage systems 102 in some embodiments both implement substantially the same functionality for efficient snapshot pair creation in synchronous replication via their respective instances of snapshot pair creation logic 114. Accordingly, each of the storage systems 102 illustratively operates as a "source" relative to the other as a "target," and vice versa, and therefore can be viewed as both source and target of bidirectional synchronous replication in an active-active configuration.

One or both of the storage systems 102 are illustratively implemented as respective distributed storage systems, also referred to herein as clustered storage systems, in which each such storage system comprises a plurality of storage nodes each comprising a set of processing modules configured to communicate with corresponding sets of processing modules on other ones of the storage nodes. The sets of processing modules of the storage nodes of the source storage system collectively comprise at least a portion of the storage controller 108A or storage controller 108B of the respective first storage system 102A or second storage system 102B. For example, in some embodiments the sets of processing modules of the storage nodes collectively comprise a distributed storage controller of the distributed storage system.

The first and second storage systems 102 in some embodiments comprise respective content addressable storage systems in which logical addresses of data pages are mapped to physical addresses of the data pages using respective content-based signatures that are generated from those data pages, as will now be described in more detail with reference to the illustrative embodiments of FIGS. 2 and 3.

Figure 2:
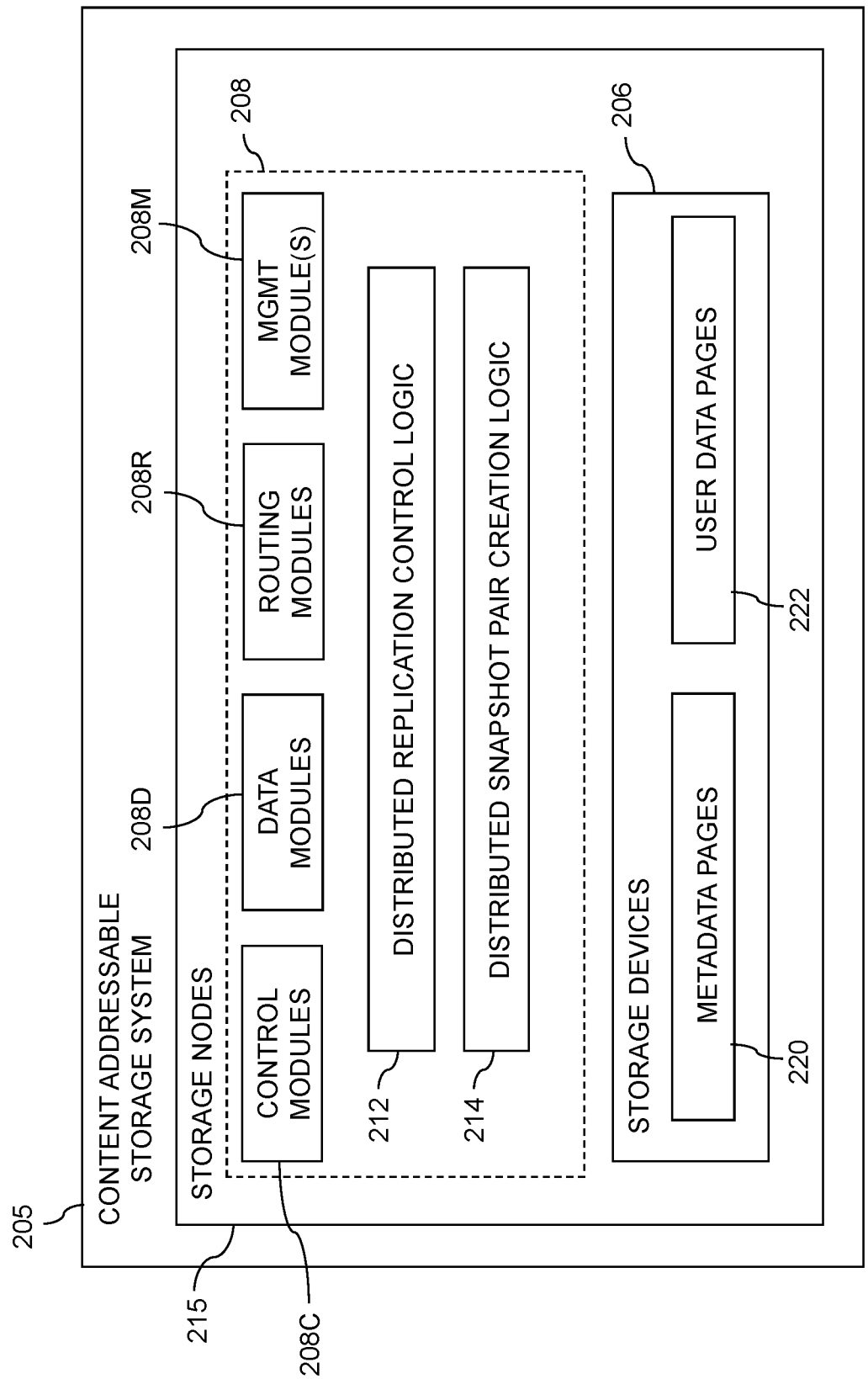
FIG. 2 shows an example of a distributed CAS system that illustratively represents one of the first and second storage systems of FIG. 1 in some embodiments.

FIG. 2 shows an example of a distributed content addressable storage (CAS) system 205 that illustratively represents a particular implementation of one of the first and second storage systems 102 of FIG. 1 in some embodiments, and accordingly is assumed to be coupled to the other one of the storage systems 102 and to one or more host devices 101 of a computer system within information processing system 100. The other storage system illustratively comprises another instance of CAS system 205.

The CAS system 205 comprises a plurality of storage devices 206 and an associated storage controller 208. The storage devices 206 store data of a plurality of storage volumes. The storage volumes illustratively comprise respective LUNs or other types of logical storage volumes. The stored data comprises metadata pages 220 and user data pages 222, both described in more detail elsewhere herein. The storage devices 206 and storage controller 208 are distributed across multiple storage nodes 215. The CAS system 205 can include additional components, such as a write cache and a write cache journal, each also illustratively distributed across the storage nodes 215 of the CAS system 205.

The CAS system 205 is illustratively implemented as a distributed storage system, also referred to herein as a clustered storage system, in which each of at least a subset of the storage nodes 215 comprises a set of processing modules configured to communicate with corresponding sets of processing modules on other ones of the storage nodes 215. The sets of processing modules of the storage nodes of the CAS system 205 collectively comprise at least a portion of the storage controller 208 of the CAS system 205. For example, in some embodiments the sets of processing modules of the storage nodes collectively comprise a distributed storage controller of the CAS system 205. A "distributed storage system" as that term is broadly used herein is intended to encompass any storage system that, like the CAS system 205, is distributed across multiple storage nodes.

Although it is assumed that both the first storage system 102A and the second storage system 102B are content addressable storage systems in some embodiments, other types of storage systems can be used for one or both of the first storage system 102A and the second storage system 102B in other embodiments. For example, it is possible that at least one of the storage systems 102 in an illustrative embodiment need not be a content addressable storage system and need not include an ability to generate content-based signatures. In an embodiment of this type, the signature generation functionality can be implemented in a host device.

The storage controller 208 in the present embodiment is configured to implement functionality for efficient snapshot pair creation in synchronous replication of the type previously described in conjunction with FIG. 1. For example, the CAS system 205 illustratively participates as a source storage system in a replication process with a target storage system that is implemented as another instance of the CAS system 205.

The storage controller 208 includes distributed modules 212 and 214, which are configured to operate in a manner similar to that described above for respective corresponding replication control logic 112 and snapshot pair creation logic 114 of the storage controllers 108 of system 100. Module 212 is more particularly referred to as distributed replication control logic, and illustratively comprises multiple replication control logic instances on respective ones of the storage nodes 215, with the multiple replication control logic instances comprising at least a portion of a replication engine configured to perform process operations associated with synchronous replication. Module 214 more particularly comprises distributed snapshot pair creation logic with different instances thereof also being implemented on respective ones of the storage nodes 215. Each of the storage nodes 215 of the CAS system 205 is assumed to be implemented using at least one processing device comprising a processor coupled to a memory.

In the CAS system 205, logical addresses of data pages are mapped to physical addresses of the data pages using respective content-based signatures that are generated from those data pages. The data pages illustratively include user data pages 222. Metadata pages 220 are typically handled in a different manner, as will be described.

The term "page" as used in this and other contexts herein is intended to be broadly construed so as to encompass any of a wide variety of different types of blocks that may be utilized in a block storage device of a storage system. Different native page sizes are generally utilized in different storage systems of different types. For example, XtremIO™ X1 storage arrays utilize a native page size of 8 kilobytes (KB), while XtremIO™ X2 storage arrays utilize a native page size of 16 KB. Larger native page sizes of 64 KB and 128 KB are utilized in VMAX® V2 and VMAX® V3 storage arrays, respectively. The native page size generally refers to a typical page size at which the storage system ordinarily operates, although it is possible that some storage systems may support multiple distinct page sizes as a configurable parameter of the system. Each such page size of a given storage system may be considered a "native page size" of the storage system as that term is broadly used herein.

A given "page" as the term is broadly used herein should therefore not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing data pages of the CAS system 205.

Also, the term "storage volume" as used herein is intended to be broadly construed, and should not be viewed as being limited to any particular format or configuration.

The content-based signatures utilized in some embodiments illustratively comprise respective hash digests of respective data pages of a storage volume. A given one of the hash digests is generated in illustrative embodiments by applying a secure hashing algorithm to content of a corresponding one of the data pages of the storage volume. For example, a given hash digest can be generated by application of a hash function such as the well-known Secure Hashing Algorithm 1 (SHA1) to the content of its corresponding data page. Other types of secure hashing algorithms, such as SHA2 or SHA256, or more generally other hash functions, can be used in generating content-based signatures herein.

A given hash digest in illustrative embodiments is unique to the particular content of the page from which it is generated, such that two pages with exactly the same content will have the same hash digest, while two pages with different content will have different hash digests. It is also possible that other types of content-based signatures may be used, such as hash handles of the type described elsewhere herein. A hash handle generally provides a shortened representation of its corresponding hash digest. More particularly, the hash handles are shorter in length than respective hash digests that are generated by applying a secure hashing algorithm to respective ones of the data pages. Hash handles are considered examples of "content-based signatures" as that term is broadly used herein.

As indicated above, the storage controller 208 in this embodiment is implemented as a distributed storage controller that comprises sets of processing modules distributed over the storage nodes 215. The storage controller 208 is therefore an example of what is more generally referred to herein as a distributed storage controller.

It is assumed in some embodiments that the processing modules of the storage controller 208 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of the storage controller 208 illustratively comprise control modules 208C, data modules 208D, routing modules 208R and at least one management module 208M. Again, these and possibly other processing modules of the storage controller 208 are illustratively interconnected with one another in the full mesh network, such that each of the modules can communicate with each of the other modules, although other types of networks and different module interconnection arrangements can be used in other embodiments.

The management module 208M of the distributed storage controller in this embodiment may more particularly comprise a system-wide management module, also referred to herein as a system manager. Other embodiments can include multiple instances of the management module 208M implemented on different ones of the storage nodes 215. It is therefore assumed that the storage controller 208 comprises one or more management modules 208M.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

The processing modules of the storage controller 208 as disclosed herein utilize metadata structures that include logical layer and physical layer mapping tables to be described below. It is to be appreciated that these particular tables are only examples, and other tables or metadata structures having different configurations of entries and fields can be used in other embodiments. The logical layer and physical layer mapping tables in this embodiment illustratively include the following:

1. An address-to-hash ("A2H") table. The A2H table illustratively comprises a plurality of entries accessible utilizing logical addresses as respective keys, with each such entry of the A2H table comprising a corresponding one of the logical addresses, a corresponding one of the hash handles, and possibly one or more additional fields. In some embodiments, the A2H table is assumed to comprise full hash digests in place of or in addition to hash handles. Other configurations are possible, and the term "address-to-hash table" as used herein is therefore intended to be broadly construed.

2. A hash-to-data ("H2D") table. The H2D table illustratively comprises a plurality of entries accessible utilizing hash handles as respective keys, with each such entry of the H2D table comprising a corresponding one of the hash handles, a physical offset of a corresponding one of the data pages, and possibly one or more additional fields. Again, full hash digests can be used in place of or in addition to hash handles.

3. A hash metadata ("HMD") table. The HMD table illustratively comprises a plurality of entries accessible utilizing hash handles as respective keys. Each such entry of the HMD table comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. The HMD table illustratively comprises at least a portion of the same information that is found in the H2D table. Accordingly, in other embodiments, those two tables can be combined into a single table, illustratively referred to as an H2D table, an HMD table or another type of physical layer mapping table providing a mapping between hash values, such as hash handles or hash digests, and corresponding physical addresses of data pages.

4. A physical layer based ("PLB") table. The PLB table illustratively comprises a plurality of entries accessible utilizing physical offsets as respective keys, with each such entry of the PLB table comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length. Hash digests can be used in place of in addition to hash handles in some embodiments.

Again, the logical layer and physical layer mapping tables referred to above are examples only, and can be varied in other embodiments. For example, other types of hash-to-physical ("H2P") mapping tables may be used in addition to or in place of the above-noted H2D, HMD and/or PLB tables.

In some embodiments, certain ones of the above-described mapping tables are maintained by particular modules of storage controller 208. For example, the mapping tables maintained by the control modules 208C illustratively comprise at least one A2H table and possibly also at least one H2D table. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based signatures, as described in further detail elsewhere herein.

The control modules 208C may further comprise additional components such as respective messaging interfaces that are utilized by the control modules 208C to process routing-to-control messages received from the routing modules 208R, and to generate control-to-routing messages for transmission to the routing modules 208R. Such messaging interfaces can also be configured to process instructions and other messages received from the management module 208M and to generate messages for transmission to the management module 208M.

The data modules 208D comprise respective control interfaces. These control interfaces support communication between the data modules 208D and the control modules 208C. Also included in the data modules are respective SSD interfaces. These SSD interfaces support communications with corresponding ones of the storage devices 206 of the CAS system 205.

The above-described processing module arrangements are presented by way of example only, and can be varied in other embodiments.

In some embodiments, a given data path of the CAS system 205 comprises a particular one of the routing modules 208R, a particular one of the control modules 208C and a particular one of the data modules 208D, each configured to handle different stages of the data path. For example, a given IO request can comprise a read request or a write request received in the particular control module from the particular routing module. The particular control module processes the received IO request to determine the particular data module that has access to the one or more data pages targeted by that IO request.

Communication links may be established between the various processing modules of the storage controller 208 using well-known communication protocols such as TCP/IP and remote direct memory access (RDMA). For example, respective sets of IP links used in data transfer and corresponding messaging could be associated with respective different ones of the routing modules 208R.

In some embodiments, at least portions of the functionality for efficient snapshot pair creation in synchronous replication in the CAS system are distributed over at least the control modules 208C and data modules 208D of storage controller 208. Numerous other arrangements are possible. For example, portions of the functionality can be implemented in the one or more management modules 208, or using other types and arrangements of modules within or outside of the storage controller 208.

As indicated previously, the storage devices 206 are configured to store metadata pages 220 and user data pages 222, and may also store additional information not explicitly shown such as, for example, one or more system checkpoints and/or snapshots of storage volumes, and one or more write journals such as the write cache journal. The metadata pages 220 and the user data pages 222 in some embodiments are illustratively stored in respective designated metadata and user data areas of the storage devices 206. Accordingly, metadata pages 220 and user data pages 222 may be viewed as corresponding to respective designated metadata and user data areas of the storage devices 206.

As noted above, a given "page" as the term is broadly used herein should not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 220 and the user data pages 222.

The user data pages 222 are part of a plurality of logical storage volumes configured to store files, blocks, objects or other arrangements of data, each also generally referred to herein as a "data item," on behalf of users of the CAS system 205. Each such logical storage volume may comprise particular ones of the above-noted user data pages 222 of the user data area. The user data stored in the user data pages 222 can include any type of user data that may be utilized in the system 100. The term "user data" herein is therefore also intended to be broadly construed.

A given storage volume for which content-based signatures are generated, illustratively by signature generators implemented in respective ones of the control modules 208R and/or elsewhere in the storage nodes 215, can comprise a set of one or more LUNs, each including multiple ones of the user data pages 222 stored in storage devices 206.

The CAS system 205 in the embodiment of FIG. 2 is configured to generate hash metadata providing a mapping between content-based digests of respective ones of the user data pages 222 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 222. The hash metadata generated by the CAS system 205 is illustratively stored as metadata pages 220 in the metadata area. The generation and storage of the hash metadata is assumed to be performed under the control of the storage controller 208.

Each of the metadata pages 220 characterizes a plurality of the user data pages 222. For example, in a given set of user data pages representing a portion of the user data pages 222, each of the user data pages is characterized by a volume identifier, an offset and a content-based signature. The content-based signature is generated as a hash function of content of the corresponding user data page. Illustrative hash functions that may be used to generate the content-based signature include the above-noted SHA1 secure hashing algorithm, or other secure hashing algorithms known to those skilled in the art, including SHA2, SHA256 and many others. The content-based signature is utilized to determine the location of the corresponding user data page within the user data area of the storage devices 206.

Each of the metadata pages 220 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 220 in an illustrative embodiment comprises metadata pages having respective signatures. Each such metadata page characterizes a different set of user data pages. For example, the characterizing information in each metadata page can include the volume identifiers, offsets and content-based signatures for each of the user data pages that are characterized by that metadata page. It is to be appreciated, however, that the user data and metadata page configurations described above are examples only, and numerous alternative user data and metadata page configurations can be used in other embodiments.

Ownership of a user data logical address space within the CAS system 205 is illustratively distributed among the control modules 208C.

The functionality for efficient snapshot pair creation in synchronous replication in the CAS system 205 in this embodiment is assumed to be distributed across multiple distributed processing modules, including at least a subset of the processing modules 208C, 208D, 208R and 208M of the storage controller 208.

For example, the management module 208M of the storage controller 208 may include a snapshot pair creation logic instance that engages corresponding snapshot pair creation logic instances in all of the control modules 208C in order to support efficient snapshot pair creation in synchronous replication in the CAS system 205.

In some embodiments, each of the user data pages 222 has a fixed size such as, for example, 8 KB, and its content-based signature is a 20-byte signature generated using the SHA1 secure hashing algorithm. Also, each page has a volume identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

The storage controller 208 in this example is configured to group consecutive pages into page groups, to arrange the page groups into slices, and to assign the slices to different ones of the control modules 208C. For example, if there are 1024 slices distributed evenly across the control modules 208C, and there are a total of 16 control modules in a given implementation, each of the control modules "owns" 1024/16=64 slices. In such arrangements, different ones of the slices are assigned to different ones of the control modules 208C such that control of the slices within the storage controller 208 of the CAS system 205 is substantially evenly distributed over the control modules 208C of the storage controller 208.

The data modules 208D allow a user to locate a given user data page based on its signature. Each metadata page also has a size of 8 KB and includes multiple instances of the <lun_id, offset, signature> for respective ones of a plurality of the user data pages 222. Such metadata pages 220 are illustratively generated by the control modules 208C but are accessed using the data modules 208D based on a metadata page signature.

The metadata page signature in this embodiment is a 20-byte signature but is not based on the content of the metadata page. Instead, the metadata page signature is generated based on an 8-byte metadata page identifier that is a function of the volume identifier and offset information of that metadata page.

If a user wants to read a user data page having a particular volume identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the data module. This metadata page will include the <lun_id, offset, signature> for the user data page if the user page exists. The signature of the user data page is then used to retrieve that user data page, also via the data module.

Write requests processed in the CAS system 205 each illustratively comprise one or more IO operations directing that at least one data item of the CAS system 205 be written to in a particular manner. A given write request is illustratively received in the CAS system 205 from one of the host devices 101 over network 104. In some embodiments, a write request is received in the storage controller 208 of the CAS system 205, and directed from one processing module to another processing module of the storage controller 208. For example, a received write request may be directed from a routing module 208R of the storage controller 208 to a particular control module 208C of the storage controller 208. Other arrangements for receiving and processing write requests from one or more of the host devices 101 can be used.

The term "write request" as used herein is intended to be broadly construed, so as to encompass one or more IO operations directing that at least one data item of a storage system be written to in a particular manner. A given write request is illustratively received in a storage system from a host device.

In some embodiments, the control modules 208C, data modules 208D and routing modules 208R of the storage nodes 215 communicate with one another over a high-speed internal network such as an InfiniBand network. The control modules 208C, data modules 208D and routing modules 208R coordinate with one another to accomplish various IO processing tasks, as described elsewhere herein.

The write requests from the host devices identify particular data pages to be written in the CAS system 205 by their corresponding logical addresses each illustratively comprising a volume identifier and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The CAS system 205 illustratively utilizes a two-level mapping process to map logical block addresses to physical block addresses. In some embodiments, the first level of mapping uses an A2H table and the second level of mapping uses an HMD table, with the A2H and HMD tables corresponding to respective logical and physical layers of the content-based signature mapping within the CAS system 205. The HMD table or a given portion thereof in some embodiments disclosed herein is more particularly referred to as an H2D table or H2P table, although it is to be understood that these and other mapping tables or other metadata structures referred to herein can be varied in other embodiments.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 206. This is also referred to as physical layer mapping.

Examples of these and other metadata structures utilized in illustrative embodiments were described elsewhere herein. These particular examples illustratively include respective A2H, H2D, HMD and PLB tables. In some embodiments, the A2H and H2D tables are utilized primarily by the control modules 208C, while the HMD and PLB tables are utilized primarily by the data modules 208D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the CAS system 205. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the CAS system 205 correspond to respective physical blocks of a physical layer of the CAS system 205. The user data pages of the logical layer are organized by LBA and have reference via respective content-based signatures to particular physical blocks of the physical layer.

Each of the physical blocks has an associated reference count that is maintained within the CAS system 205. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 208C, 208D, 208R and 208M as shown in the FIG. 2 embodiment is presented by way of example only. Numerous alternative arrangements of processing modules of a distributed storage controller may be used to implement efficient snapshot pair creation in synchronous replication in a distributed CAS system or other type of distributed storage system in other embodiments.

Additional examples of content addressable storage functionality that may be implemented in some embodiments by control modules 208C, data modules 208D, routing modules 208R and management module(s) 208M of storage controller 208 can be found in U.S. Pat. No. 9,104,326, entitled "Scalable Block Data Storage Using Content Addressing," which is incorporated by reference herein. Alternative arrangements of these and other storage node processing modules of a distributed storage controller in a distributed CAS system or other type of distributed storage system can be used in other embodiments.

As indicated above, the CAS system 205 illustratively comprises storage nodes 215 interconnected in a mesh network, with each such storage node comprising a set of processing modules configured communicate with corresponding sets of processing modules on other ones of the storage nodes. A given such set of processing modules comprises at least a routing module, a control module and a data module, with the sets of processing modules of the storage nodes 215 of the CAS system 205 collectively comprising at least a portion of the storage controller 208 of the CAS system 205.

The storage nodes 215 and their respective sets of processing modules are managed by a system manager, illustratively implemented as a management module 208M within the set of processing modules on at least one of the storage nodes 215. Each storage node 215 illustratively comprises a CPU or other type of processor, a memory, a network interface card (NIC) or other type of network interface, and a subset of the storage devices 206, possibly arranged as part of a disk array enclosure (DAE) of the storage node. These and other references to "disks" herein are intended to refer generally to storage devices, including SSDs, and should therefore not be viewed as limited in any way to spinning magnetic media.

An example of the operation of the CAS system 205 in processing IO operations will now be described with reference to FIG. 3, which shows the relationship between routing, control and data modules of one possible distributed implementation of CAS system 205 in an illustrative embodiment. More particularly, FIG. 3 illustrates a portion 300 of the CAS system 205, showing a routing module 208R-x, a control module 208C-y and a data module 208D-z in a distributed implementation of the storage controller 208. The routing module 208R-x, the control module 208C-y and the data module 208D-z are also denoted in this embodiment as an R-module, a C-module and a D-module, respectively.

These modules are respective processing modules of the storage controller 208, and are potentially located on different ones of the storage nodes 215 of the CAS system 205. For example, each of the storage nodes 215 of the CAS system 205 illustratively comprises at least one R-module, at least one C-module and at least one D-module, although many other storage node configurations are possible. In the present embodiment, the routing module 208R-x, the control module 208C-y and the data module 208D-z are assumed to be on respective different storage nodes x, y and z of the CAS system 205. The storage nodes x, y and z represent respective particular ones of the storage nodes 215. The storage node z that implements the D-module 208D-z comprises a subset of the storage devices 206 of the CAS system 205, with the subset of storage devices 206 on storage node z being denoted as storage devices 206-z. Each of the other storage nodes 215 of the CAS system 205 similarly has a different subset of the storage devices 206 associated therewith.

It is assumed in this example that the CAS system 205 manages data using a fixed-size page granularity (e.g., 4 KB, 8 KB or 16 KB), also referred to herein as the native page size of the CAS system 205. A unique hash digest is computed for each of the data pages by a content-based signature generator, illustratively using SHA1 or another secure hashing algorithm of the type described elsewhere herein.

In the CAS system 205, routing modules 208R such as R-module 208R-x illustratively include a storage command parser as shown, such as a SCSI command parser, although other command parsers for other storage protocols can be used in other embodiments. The routing modules 208R receive IO requests from one or more of the host devices 101, parse the corresponding storage commands and route them to the appropriate control modules 208C, which may be located on different storage nodes 215, illustratively using an address-to-control ("A2C") table. The A2C table maps different portions of a logical address space of the CAS system 205 across different ones of the control modules 208C. A given IO request can be sent by the corresponding one of the host devices 101 to any of the routing modules 208R of the CAS system 205.

The control modules 208C such as control module 208C-y receive the IO requests from the routing modules 208R, and use mapping tables such as the above-described A2H and H2D tables to identify the appropriate data modules 208D that store the corresponding data pages in the distributed CAS system 205. This illustratively includes performing a logical address to hash mapping as shown in the figure.

In processing read requests, the C-module 208C-y retrieves from the A2H table the hash digests of the corresponding requested pages, and sends read requests to the appropriate data modules 208D based on the H2D table.

In processing write requests, the C-module 208C-y illustratively computes the hash digests of the data pages based on the write data, sends write requests to the corresponding data modules 208D as determined from the H2D table, and updates the A2H table.

The data modules 208D such as D-module 208D-z are responsible for the physical storage of the data pages, and use mapping tables such as the above-described HMD and PLB tables and/or other types of H2P tables to determine the physical location of a given data page in the subset of storage devices 206 associated with that data module, using a hash digest, hash handle or other content-based signature supplied by a control module. This illustratively includes performing a hash to physical location mapping as shown in the figure. Such a hash to physical location mapping can utilize an H2P table of the type described elsewhere herein, illustratively comprising at least portions of the above-noted HMD and PLB tables. The data modules 208D in some embodiments additionally store a copy or "mirror" of such metadata in a memory of the respective corresponding storage nodes 215, in order to optimize performance by reducing accesses to the associated storage devices 206 during system operation.

A given one of the host devices 101 illustratively sends an IO request to a particular one of the routing modules 208R, possibly using random selection or another type of algorithm such as round robin to select a particular routing module for a particular IO request. Such selection can be implemented as part of a path selection algorithm performed by a multi-path input-output (MPIO) driver of the host device, in order to select a particular path comprising an initiator-target pair for delivery of the IO request to the CAS system 205. The initiator illustratively comprises a particular host bus adaptor (HBA) of the given host device, and the target illustratively comprises a particular port of the CAS system 205.

The particular features described above in conjunction with FIGS. 2 and 3 should not be construed as limiting in any way, and a wide variety of other distributed implementations of first storage system 102A and second storage system 102B are possible.

The storage systems 102 in the FIG. 1 embodiment are assumed to be implemented using at least one processing platform, with each such processing platform comprising one or more processing devices, and each such processing device comprising a processor coupled to a memory. Such processing devices can illustratively include particular arrangements of compute, storage and network resources.

The storage systems 102 may be implemented on respective distinct processing platforms, although numerous other arrangements are possible. At least portions of their associated host devices may be implemented on the same processing platforms as the storage systems 102 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the storage systems 102 to reside in different data centers. Numerous other distributed implementations of the storage systems 102 and their respective associated sets of host devices are possible.

Additional examples of processing platforms utilized to implement storage systems and possibly their associated host devices in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 101, storage systems 102, network 104, storage devices 106, storage controllers 108, storage volumes 110, replication control logic 112 and snapshot pair creation logic 114 can be used in other embodiments.

Figure 3:
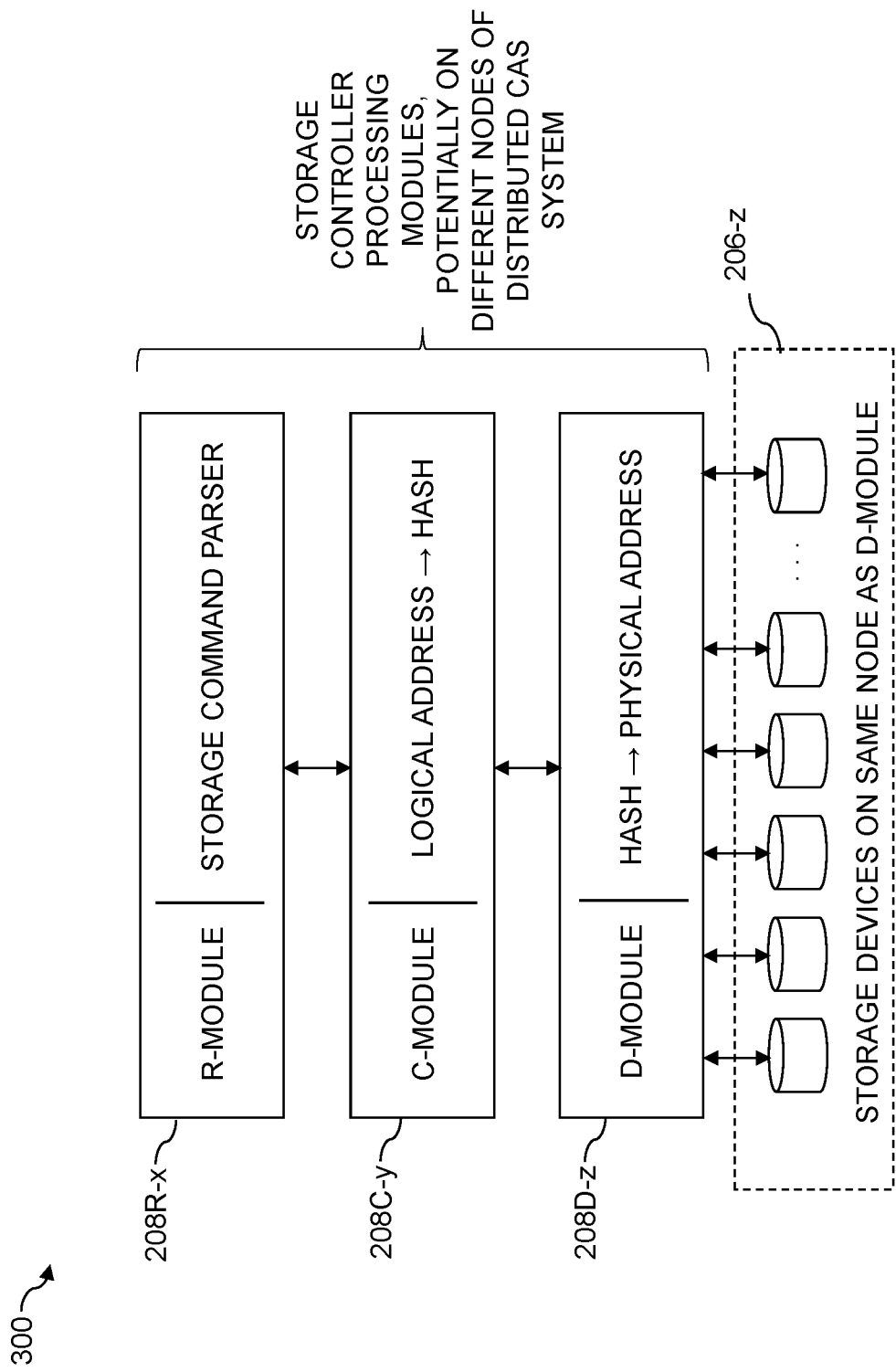
FIG. 3 shows an example relationship between routing, control and data modules of a CAS system in an illustrative embodiment.

It should be understood that the particular sets of modules and other components implemented in the system 100 as illustrated in FIGS. 1, 2 and 3 are presented by way of example only. In other embodiments, only subsets of these components, or additional or alternative sets of components, may be used, and such components may exhibit alternative functionality and configurations.

For example, in other embodiments, functionality for efficient snapshot pair creation in synchronous replication can be implemented in one or more host devices, or partially in a host device and partially in a storage system. Accordingly, illustrative embodiments are not limited to arrangements in which all such functionality is implemented in first and second storage systems or a host device, and therefore encompass various hybrid arrangements in which the functionality is distributed over one or more storage systems and one or more associated host devices, each comprising one or more processing devices.

The operation of the information processing system 100 will now be described in further detail with reference to the flow diagram of the illustrative embodiment of FIG. 4, which implements another example process for efficient snapshot pair creation in synchronous replication.

Figure 4:
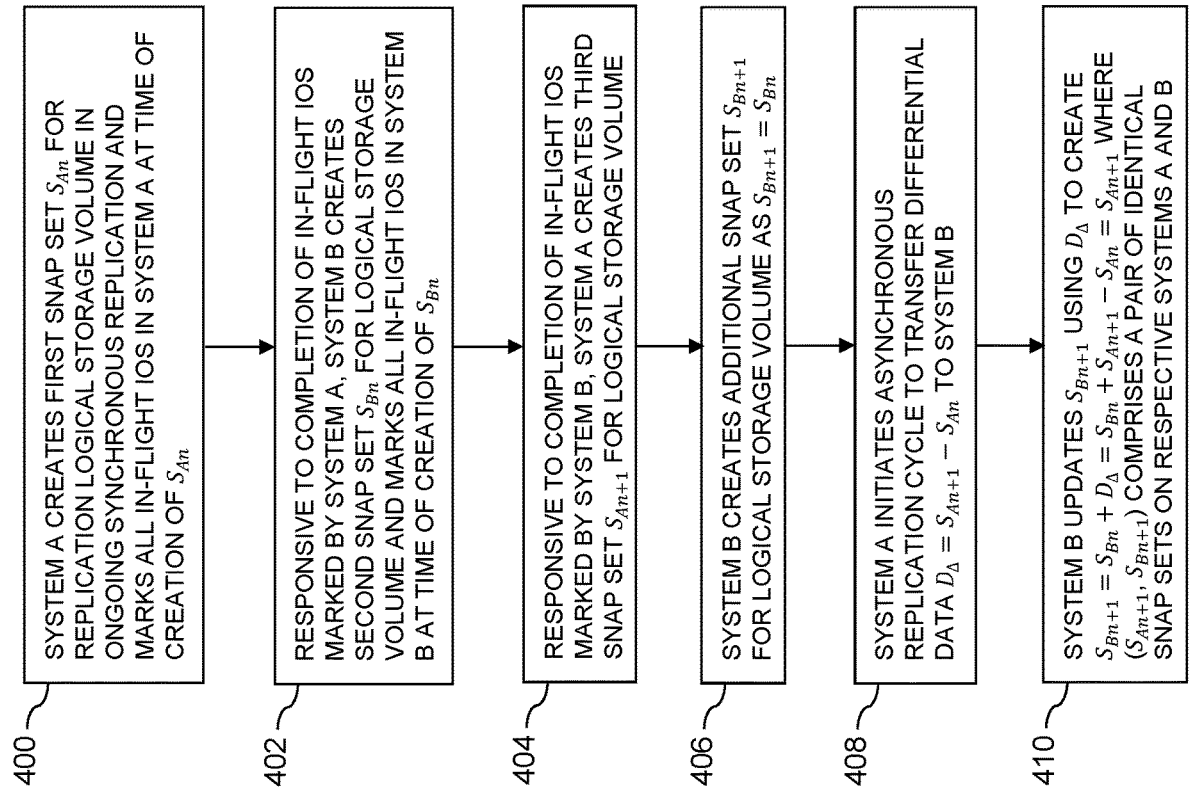
FIG. 4 is a flow diagram showing a process for efficient snapshot pair creation in synchronous replication in an illustrative embodiment.

The flow diagram of FIG. 4 more particularly shows a process for efficient snapshot pair creation in synchronous replication in an illustrative embodiment. FIG. 4 includes steps 400 through 410, collectively performed by two different storage systems, more particularly designated in the figure as system A and system B, illustratively corresponding to the first and second storage systems 102 of the metro cluster in the FIG. 1 embodiment.

The efficient snapshot pair creation process as illustrated in FIG. 4 is therefore suitable for use in system 100 but is more generally applicable to a wide variety of other types of information processing systems comprising first and second storage systems implementing functionality for efficient snapshot pair creation in synchronous replication. The process to be described is assumed to be carried out between first and second storage systems that are configured to participate in a replication process that includes at least a synchronous replication mode, and possibly includes both asynchronous and synchronous replication modes with transitions occurring between the modes. The first and second storage systems in some embodiments are more particularly assumed to comprise respective distributed CAS systems of the type previously described in conjunction with FIGS. 2 and 3.

As indicated above, the first and second storage systems are referred to in the context of FIG. 4 as respective systems A and B. Each of systems A and B illustratively operates both as "source" and "target" relative to the other of systems A and B, in conjunction with the bidirectional synchronous replication performed in an active-active configuration. More particularly, it is assumed that in the active-active configuration, data is replicated between systems A and B synchronously in both directions.

In accordance with the FIG. 4 process, the following steps are collectively performed by system A and system B, illustratively utilizing their respective instances of replication control logic 112 and snapshot pair creation logic 114.

In step 400, system A creates a first snap set $S_{An}$ for at least one replication logical storage volume in an ongoing synchronous replication and marks all in-flight IOs in system A at the time of creation of $S_{An}$. Such in-flight IOs illustratively include write operations that have arrived directly in system A from a host device, and will therefore be replicated from system A to system B as part of the synchronous replication in the direction from system A to system B, as well as write operations that have arrived in system A from system B as part of the synchronous replication in the direction from system B to system A. The latter write operations are initially received in system B directly from a host device, and are therefore replicated from system B to system A. It is assumed that all of the write operations received in system A, whether directly from a host device or indirectly from system B, are automatically recorded in system A as respective write journal entries for recovery purposes.

Accordingly, marking a specific set of in-flight IOs, such as the write operations received from system B that are still in-flight in system A at the time of creation of $S_{An}$, does not require significant additional work on the part of system A. For example, marking in some embodiments may comprise simply setting or resetting a designated bit or otherwise modifying a particular portion of an entry of a write journal for each of the in-flight IOs in system A at the time of creation of $S_{An}$.

These and other references to marking of in-flight IOs "at the time of creation" of a given snap set herein are intended to be broadly construed, so as to encompass, for example, marking all in-flight IOs within a write journal, write cache or other memory in which such in-flight IOs are recorded in system A, in conjunction with creation of the given snap set. Such marking may therefore occur, for example, immediately prior to creation of the given snap set, contemporaneous with creation of the given snap set, or immediately following creation of the given snap set, and in each case are still considered to be marked "at the time of creation" of the given snap set as that term is broadly used herein. Other snap set creation arrangements are possible in other embodiments.

Also, the term "snap set" as used herein is intended to be broadly construed, so as to encompass a set of one or more snapshots. For example, a snap set can include multiple distinct snapshots of different types for a given logical storage volume. Additionally or alternatively, a snap set can comprise multiple snapshots for respective ones of a plurality of different storage volumes.

In step 402, responsive to completion of the in-flight IOs marked by system A, system B creates a second snap set $S_{Bn}$ for the logical storage volume and marks all in-flight IOs in system B at the time of creation of $S_{Bn}$. Similar to the arrangement described in step 400 above, such marking may involve, for example, marking all in-flight IOs within a write journal, write cache or other memory in which such in-flight IOs are recorded in system B, in conjunction with creation of the given snap set. Such in-flight IOs illustratively include write operations that have arrived directly in system B from a host device, and will therefore be replicated from system B to system A as part of the synchronous replication in the direction from system B to system A, as well as write operations that have arrived in system B from system A as part of the synchronous replication in the direction from system A to system B. The latter write operations are initially received in system A directly from a host device, and are therefore replicated from system A to system B. It is assumed that all of the write operations received in system B, whether directly from a host device or indirectly from system A, are automatically recorded in system B as respective write journal entries for recovery purposes.

The snap set $S_{Bn}$ is illustratively a super set of the snap set $S_{An}$, since $S_{Bn}$ reflects the data content of $S_{An}$ plus any in-flight IOs not reflected in $S_{An}$ but subsequently completed during the time period between creation of $S_{An}$ and creation of $S_{Bn}$.

It should be noted that system B in illustrative embodiments is made aware of the completion by system A of its marked in-flight IOs via a command or other notification sent by system A. For example, system A can expressly direct system B via a command or other notification to create $S_{Bn}$, once system A has completed all of its marked in-flight IOs. These or other techniques allow system B to create $S_{Bn}$ responsive to completion of the in-flight IOs marked by system A.

In step 404, responsive to completion of the in-flight IOs marked by system B, system A creates a third snap set $S_{An+1}$ for the logical storage volume.

The snap set $S_{An+1}$ is illustratively a super set of the snap set $S_{Bn}$, since $S_{An+1}$ reflects the data content of $S_{Bn}$ plus any in-flight IOs not reflected in $S_{Bn}$ but subsequently completed during the time period between creation of $S_{Bn}$ and creation of $S_{An+1}$. Thus, $S_{An+1}$ is a super set of $S_{Bn}$, and $S_{Bn}$ is a super set of $S_{An}$.

It should be noted that system A in illustrative embodiments is made aware of the completion by system B of its marked in-flight IOs via a command or other notification sent by system B. For example, system B can expressly direct system A via a command or other notification to create $S_{An+1}$, once system B has completed all of its marked in-flight IOs. These or other techniques allow system A to create $S_{An+1}$ responsive to completion of the in-flight IOs marked by system B.

In step 406, system B creates an additional snap set $S_{Bn+1}$ for the logical storage volume as $S_{Bn+1}=S_{Bn}$. Accordingly, the initial content of $S_{Bn+1}$ is the same as that of $S_{Bn}$.

In step 408, system A initiates an asynchronous replication cycle to transfer differential data $D_A=S_{An+1}-S_{An}$ to system B. This is illustratively a single asynchronous replication cycle performed while systems A and B remain in the bidirectional synchronous replication mode of the active-active configuration, and is used to transfer the differential data between the snap sets $S_{An+1}$ and $S_{An}$. As indicated previously, in the present embodiment, $S_{An+1}$ is a super set of $S_{Bn}$, and $S_{Bn}$ is a super set of $S_{An}$.

In step 410, system B updates the additional snap set $S_{Bn+1}$ using $D_A$ to create $S_{Bn+1}=S_{Bn}+D_A=S_{Bn}+S_{An+1}-S_{an}=S_{An+1}$ where $(S_{An+1}, S_{Bn+1})$ comprises a pair of identical snap sets on respective systems A and B.

The FIG. 4 process is advantageously configured to avoid suspending host IOs and to continue the ongoing active-active synchronous replication during creation of the pair of identical snap sets by in effect transferring the $D_A$ data twice, once to a paired replication logical volume via synchronous replication data transfer, and once to the additional snap set $S_{Bn+1}$ via the single asynchronous replication cycle.

In high performance environments with relatively low IO latencies, such as environments commonly associated with distributed CAS systems of the type described in conjunction with FIGS. 2 and 3 above, the amount of retransmitted $D_A$ data will usually be only a very small fraction of the logical storage volume, and only a relatively small amount of time will be required to complete marked in-flight IOs. Similar results are achieved by the FIG. 4 process in a wide variety of other storage contexts.

Given the symmetric nature of synchronous replication in a metro cluster or other type of active-active configuration in illustrative embodiments, the FIG. 4 process can be initiated from either side of the active-active configuration. Accordingly, the designation of one particular side of the configuration as system A and the other side as system B can be reversed in other embodiments.

In some embodiments, the process is performed in a fully automated manner, without the need for any initiation by a storage administrator or other user. Alternatively, the process can be initiated from a management console of the storage system on one of the two sides by a storage administrator or other user.

Identical snap set pairs of the type created in the FIG. 4 process can be utilized in implementing automated data comparison and verification between systems A and B. Additionally or alternatively, such identical snap set pairs can be utilized to provide fast recovery after an unexpected replication session termination or other system failure, and in numerous other failure or disaster recovery scenarios, illustratively by supporting efficient synchronized rollback and restoration between systems A and B.

The particular processing operations and other system functionality described in conjunction with the flow diagram of FIG. 4 are presented by way of illustrative example only, and should not be construed as limiting the scope of the disclosure in any way. Alternative embodiments can use other types of processing operations for efficient snapshot pair creation in synchronous replication. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different efficient snapshot pair creation processes for respective different replication sessions or for different logical storage volumes within a given information processing system.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, storage controllers such as storage controllers 108 of storage systems 102 that are configured to control performance of one or more steps of FIG. 4 in their corresponding system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controllers 108, as well as other system components, may be implemented at least in part using processing devices of such processing platforms. For example, in a distributed implementation of a given one of the storage controllers 108, respective distributed modules of such a storage controller can be implemented in respective containers running on respective ones of the processing devices of a processing platform.

Illustrative embodiments provide techniques for efficient snapshot pair creation during synchronous replication of one or more logical storage volumes between first and second storage systems arranged in an active-active configuration. Such techniques can provide a number of significant advantages relative to conventional arrangements.

For example, some embodiments disclosed herein are advantageously configured to create corresponding identical point-in-time snapshots on respective first and second storage system sides of the active-active configuration, without the need to suspend all host IO operations or to drain all in-flight IO operations on each side of the active-active configuration prior to generating snapshots. As a result, excessive increases in IO latency associated with conventional approaches described elsewhere herein are avoided.

Some embodiments therefore create pairs of identical snapshots or snapshot sets on respective first and second clusters of a metro cluster or other active-active synchronous replication arrangement, without IO latency "hiccups" or other related disruptions.

These and other embodiments can be advantageously configured to allow inconsistent data to be detected and corrected in a particularly efficient manner, based at least in part on the identical snapshots created in the manner disclosed herein, without any adverse impact to storage system performance.

Functionality for efficient snapshot pair creation in synchronous replication as disclosed herein can be implemented in at least one storage system, in at least one host device, or partially in one or more storage systems and partially in one or more host devices.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for efficient snapshot pair creation in synchronous replication will now be described in greater detail with reference to FIGS. 5 and 6. Although described in the context of system 100, these platforms may also be used to implement at least portions of other information processing systems in other embodiments.

Figure 5:
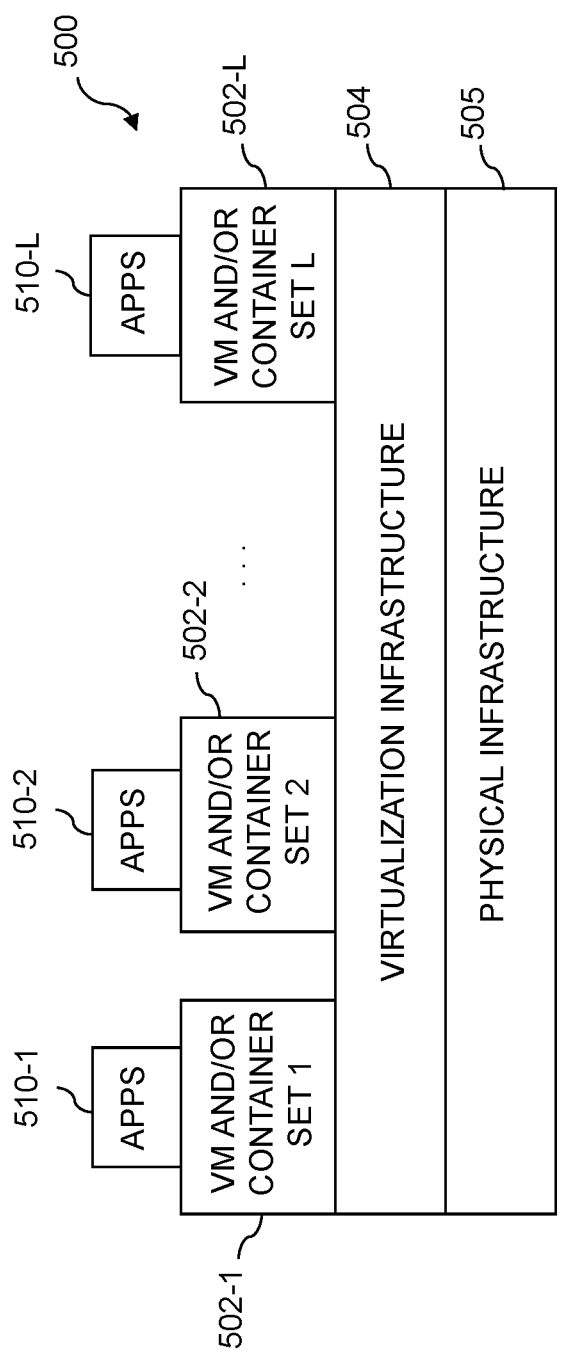
FIGS. 5 and 6 show examples of processing platforms that may be utilized to implement at least a portion of an information processing system in illustrative embodiments.
Figure 6:
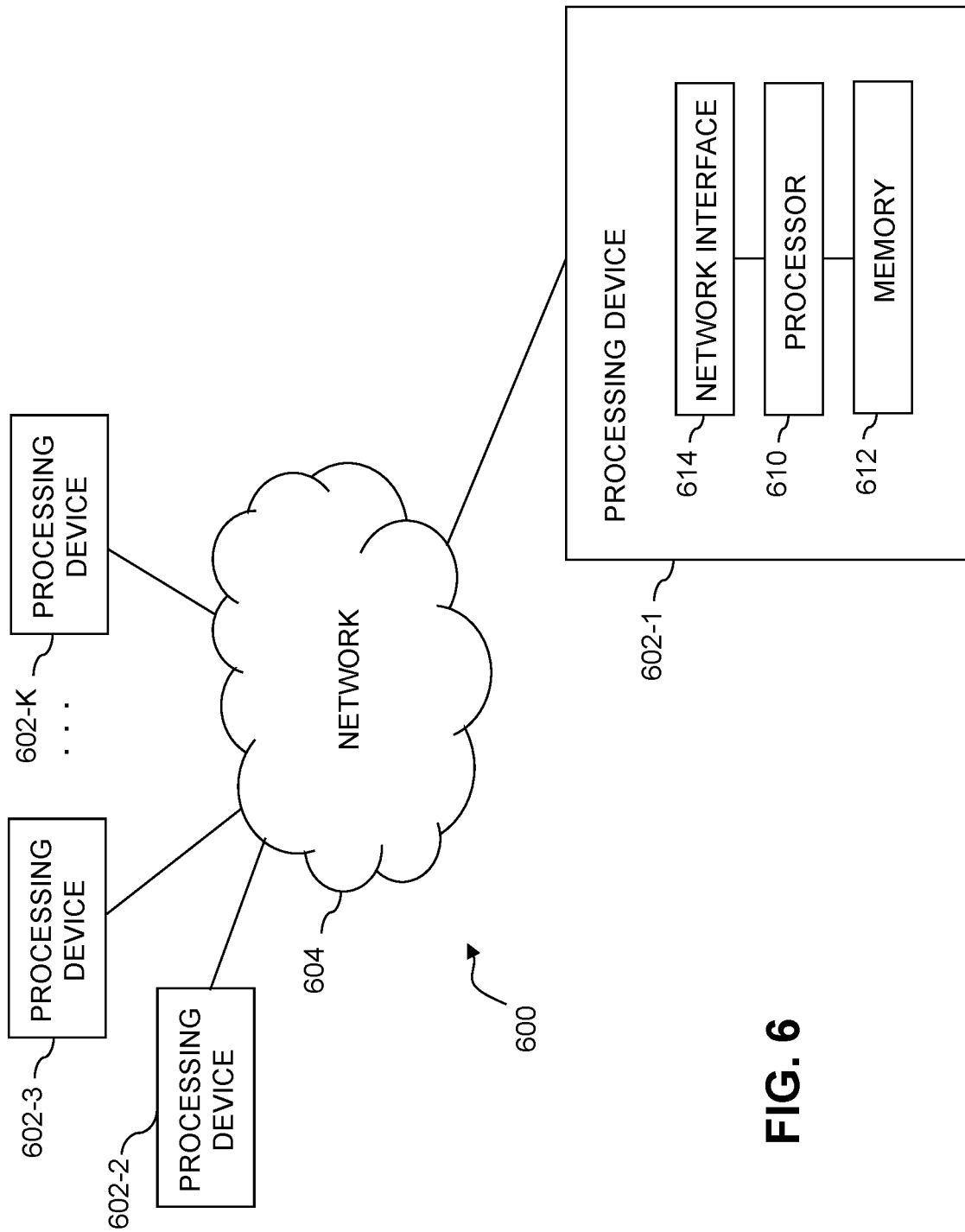

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide functionality for efficient snapshot pair creation in synchronous replication of the type described above for one or more processes running on a given one of the VMs. For example, each of the VMs can implement replication control logic instances, snapshot pair creation logic instances, and/or other components for supporting functionality for efficient snapshot pair creation in synchronous replication in the system 100.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide functionality for efficient snapshot pair creation in synchronous replication of the type described above. For example, a container host device supporting multiple containers of one or more container sets can implement one or more instances of replication control logic, snapshot pair creation logic and/or other components for supporting functionality for efficient snapshot pair creation in synchronous replication in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for efficient snapshot pair creation in synchronous replication of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, replication control logic, snapshot pair creation logic and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
said at least one processing device being configured, in conjunction with synchronous replication of at least one logical storage volume between first and second storage systems:
to create a first snapshot of the logical storage volume in the first storage system;
to create a second snapshot of the logical storage volume in the second storage system;
to create a third snapshot of the logical storage volume in the first storage system;
to initiate an asynchronous replication cycle to transfer differential data between the first and the third snapshots in the first storage system to the second storage system; and
to utilize the second snapshot and the transferred differential data to create an additional snapshot of the logical storage volume in the second storage system that is synchronized with the third snapshot in the first storage system;
wherein the first and second storage systems are arranged in an active-active configuration and the synchronous replication comprises synchronous replication of each of a first plurality of write operations from the first storage system to the second storage system and synchronous replication of each of a second plurality of write operations from the second storage system to the first storage system; and
wherein said at least one processing device is further configured:
to mark in-flight input-output operations in the first storage system at the time of creation of the first snapshot; and to create the second snapshot in the second storage system responsive to completion of the marked in-flight input-output operations in the first storage system.

2. The apparatus of claim 1 wherein said at least one processing device comprises at least portions of respective first and second storage controllers of respective ones of the first and second storage systems.

3. The apparatus of claim 1 wherein each of the first and second storage systems sends a notification to the other of the first and second storage systems to indicate that the first or second storage system has completed any write operations that were in-flight at the time of its creation of the corresponding one of the first snapshot or the second snapshot, and further wherein receipt of the notification from the first storage system in the second storage system triggers creation of the second snapshot in the second storage system, and receipt of the notification from the second storage system in the first storage system triggers creation of the third snapshot in the first storage system.

4. The apparatus of claim 1 wherein the second snapshot in the second storage system corresponds to the first snapshot in the first storage system but captures any subsequent modifications to the logical storage volume based on completion of the marked in-flight input-output operations in the first storage system.

5. The apparatus of claim 1 wherein said at least one processing device is further configured:
to mark in-flight input-output operations in the second storage system at the time of creation of the second snapshot; and
to create the third snapshot in the first storage system responsive to completion of the marked in-flight input-output operations in the second storage system.

6. The apparatus of claim 5 wherein the third snapshot in the first storage system corresponds to the second snapshot in the second storage system but captures any subsequent modifications to the logical storage volume based on completion of the marked in-flight input-output operations in the second storage system.

7. The apparatus of claim 1 wherein utilizing the second snapshot and the transferred differential data to create an additional snapshot of the logical storage volume in the second storage system that is synchronized with the third snapshot in the first storage system comprises:
creating a fourth snapshot of the second snapshot in the second storage system; and
updating the fourth snapshot using the transferred differential data so as to synchronize the fourth snapshot in the second storage system with the third snapshot in the first storage system.

8. The apparatus of claim 7 wherein content of the fourth snapshot is initially the same as content of the second snapshot at the time of creation of the fourth snapshot.

9. The apparatus of claim 7 wherein the transferred differential data comprises an asynchronous replication delta between the third and first snapshots and updating the fourth snapshot comprises adding the asynchronous replication delta to the initial content of the fourth snapshot.

10. The apparatus of claim 1 wherein the first, second, third and additional snapshots comprise respective first, second, third and additional snapshot sets each comprising a plurality of contemporaneous snapshots of respective ones of a plurality of logical storage volumes subject to the synchronous replication between the first and second storage systems.

11. A method comprising:
in conjunction with synchronous replication of at least one logical storage volume between first and second storage systems:
to create a first snapshot of the logical storage volume in the first storage system;
to create a second snapshot of the logical storage volume in the second storage system;
to create a third snapshot of the logical storage volume in the first storage system;
to initiate an asynchronous replication cycle to transfer differential data between the first and the third snapshots in the first storage system to the second storage system; and
to utilize the second snapshot and the transferred differential data to create an additional snapshot of the logical storage volume in the second storage system that is synchronized with the third snapshot in the first storage system;
wherein the first and second storage systems are arranged in an active-active configuration and the synchronous replication comprises synchronous replication of each of a first plurality of write operations from the first storage system to the second storage system and synchronous replication of each of a second plurality of write operations from the second storage system to the first storage system;
wherein the method further comprises:
marking in-flight input-output operations in the first storage system at the time of creation of the first snapshot; and
creating the second snapshot in the second storage system responsive to completion of the marked in-flight input-output operations in the first storage system; and
wherein the method is performed by at least one processing device comprising a processor coupled to a memory.

12. The method of claim 11 further comprising:
marking in-flight input-output operations in the second storage system at the time of creation of the second snapshot; and
creating the third snapshot in the first storage system responsive to completion of the marked in-flight input-output operations in the second storage system.

13. The method of claim 11 wherein utilizing the second snapshot and the transferred differential data to create an additional snapshot of the logical storage volume in the second storage system that is synchronized with the third snapshot in the first storage system comprises:
creating a fourth snapshot of the second snapshot in the second storage system; and
updating the fourth snapshot using the transferred differential data so as to synchronize the fourth snapshot in the second storage system with the third snapshot in the first storage system.

14. The method of claim 11 wherein the first, second, third and additional snapshots comprise respective first, second, third and additional snapshot sets each comprising a plurality of contemporaneous snapshots of respective ones of a plurality of logical storage volumes subject to the synchronous replication between the first and second storage systems.

15. A computer program product comprising a non-transitory processor-readable storage medium having stored therein program code of one or more software programs, wherein the program code when executed by at least one processing device causes said at least one processing device, in conjunction with synchronous replication of at least one logical storage volume between first and second storage systems:
- to create a first snapshot of the logical storage volume in the first storage system;
- to create a second snapshot of the logical storage volume in the second storage system;
- to create a third snapshot of the logical storage volume in the first storage system;
- to initiate an asynchronous replication cycle to transfer differential data between the first and the third snapshots in the first storage system to the second storage system; and
- to utilize the second snapshot and the transferred differential data to create an additional snapshot of the logical storage volume in the second storage system that is synchronized with the third snapshot in the first storage system;
- wherein the first and second storage systems are arranged in an active-active configuration and the synchronous replication comprises synchronous replication of each of a first plurality of write operations from the first storage system to the second storage system and synchronous replication of each of a second plurality of write operations from the second storage system to the first storage system; and
- wherein the program code when executed by said at least one processing device further causes said at least one processing device:
- to mark in-flight input-output operations in the first storage system at the time of creation of the first snapshot; and
- to create the second snapshot in the second storage system responsive to completion of the marked in-flight input-output operations in the first storage system.

16. The computer program product of claim 15 wherein the program code when executed by said at least one processing device further causes said at least one processing device:
- to mark in-flight input-output operations in the second storage system at the time of creation of the second snapshot; and
- to create the third snapshot in the first storage system responsive to completion of the marked in-flight input-output operations in the second storage system.

17. The computer program product of claim 15 wherein utilizing the second snapshot and the transferred differential data to create an additional snapshot of the logical storage volume in the second storage system that is synchronized with the third snapshot in the first storage system comprises:
- creating a fourth snapshot of the second snapshot in the second storage system; and
- updating the fourth snapshot using the transferred differential data so as to synchronize the fourth snapshot in the second storage system with the third snapshot in the first storage system.

18. The computer program product of claim 17 wherein content of the fourth snapshot is initially the same as content of the second snapshot at the time of creation of the fourth snapshot.

19. The computer program product of claim 17 wherein the transferred differential data comprises an asynchronous replication delta between the third and first snapshots and updating the fourth snapshot comprises adding the asynchronous replication delta to the initial content of the fourth snapshot.

20. The computer program product of claim 15 wherein the first, second, third and additional snapshots comprise respective first, second, third and additional snapshot sets each comprising a plurality of contemporaneous snapshots of respective ones of a plurality of logical storage volumes subject to the synchronous replication between the first and second storage systems.

* * * * *